United States Patent [19]
Mizuno

[11] Patent Number: 4,719,339
[45] Date of Patent: Jan. 12, 1988

[54] COORDINATES DETECTOR WHEREIN X AND Y EMITTING ELEMENTS ARE ENABLED INDEPENDENTLY OF EACH OTHER

[75] Inventor: Sakuyuki Mizuno, Kunitachi, Japan

[73] Assignee: Kabushiki Kaisha Toshiba, Kawasaki, Japan

[21] Appl. No.: 715,401

[22] Filed: Mar. 25, 1985

[30] Foreign Application Priority Data

Mar. 31, 1984 [JP] Japan ................... 59-63591

[51] Int. Cl.⁴ .................... G01V 9/04; H01J 40/14
[52] U.S. Cl. .................................... 250/221; 340/556
[58] Field of Search .................... 250/221, 222.1; 340/555, 556

[56] References Cited

U.S. PATENT DOCUMENTS

| | | | |
|---|---|---|---|
| 3,746,863 | 7/1973 | Pronovost | 340/556 |
| 3,764,813 | 10/1973 | Clement et al. | 250/221 |
| 4,063,085 | 12/1977 | Montanvert | 250/221 |
| 4,313,109 | 1/1982 | Funk et al. | 250/221 |
| 4,413,314 | 11/1983 | Slater | 364/188 |
| 4,517,559 | 5/1985 | Dietch et al. | 250/221 |

Primary Examiner—Edward P. Westin
Assistant Examiner—William L. Oen
Attorney, Agent, or Firm—Oblon, Fisher, Spivak, McClelland & Maier

[57] ABSTRACT

A coordinates detector comprises a plurality of pairs of light emitting and receiving elements arranged such that in an X direction pairs of light emitting and receiving elements are located in parallel and in a Y direction pairs of light emitting and receiving elements are located in parallel on an orthogonal coordinates plane. The pairs of light emitting and receiving elements are sequentially, simultaneously and separately enabled and a two-dimensional designation position is detected from the detection output of the light receiving element and a signal for selecting the pair of light emitting and receiving elements.

8 Claims, 4 Drawing Figures

COORDINATES DETECTOR WHEREIN X AND Y EMITTING ELEMENTS ARE ENABLED INDEPENDENTLY OF EACH OTHER

BACKGROUND OF THE INVENTION

This invention relates to a coordinates detector for detecting a designation position in a coordinates plane.

A coordinates detector utilizing light, such as an infrared ray, is conventionally known which is adapted to detect the presence or absence of input position data depending upon whether direct light is blocked which light passes through a portion corresponding to a desired position in a coordinate plane. That is, a plurality of pairs of light emitting and receiving elements are arranged such that pairs of light emitting and receiving elements in an X direction are located in parallel and in a Y direction are located in parallel on the orthogonal coordinates (X, Y) plane. The pairs of X and Y direction light transmitting and receiving elements are sequentially scanned to obtain a detection output and, when an optical path between a pair of light transmitting and receiving elements is shut off by a position designation, the corresponding X and Y direction position data can be obtained due to the interruption of light on the optical path mentioned.

With N and $\Delta t$ representing a sum of pairs of X and Y direction light emitting and receiving elements and the time required for one pair of light transmitting and receiving elements to be scanned, the time T required for all pairs of X and Y direction light emitting and receiving elements to be scanned is expressed as follows:

$$T = N \times \Delta t \tag{1}$$

Therefore, if the number of light emitting and receiving elements is increased in order to perform a position detection operation over a wider range or an exact position detection operation, an extension in time is required for performing a scanning operation, resulting in a delay in the position detection and a decrease in the response characteristic.

SUMMARY OF THE INVENTION

It is accordingly the object of this invention to provide a coordinates detector which, even if the number of pairs of light emitting and receiving elements is increased, can assure less time for scanning and a better response characteristic.

According to this invention, there is provided a coordinates detector including a plurality of pairs of X and Y direction light emitting and receiving elements in an orthogonal coordinates (X, Y) plane, in which pairs of X and Y direction light emitting and receiving elements are sequentially and separately scanned to obtain and store detection output data, and the position data can be obtained from the memory contents stored.

According to this invention it is possible to provide a coordinates detector, which can obtain a high-speed response even if there is an increase in the number of light emitting and receiving elements.

DETAILED DESCRIPTION OF THE PREFERRED EMBODIMENTS

Figure 1:
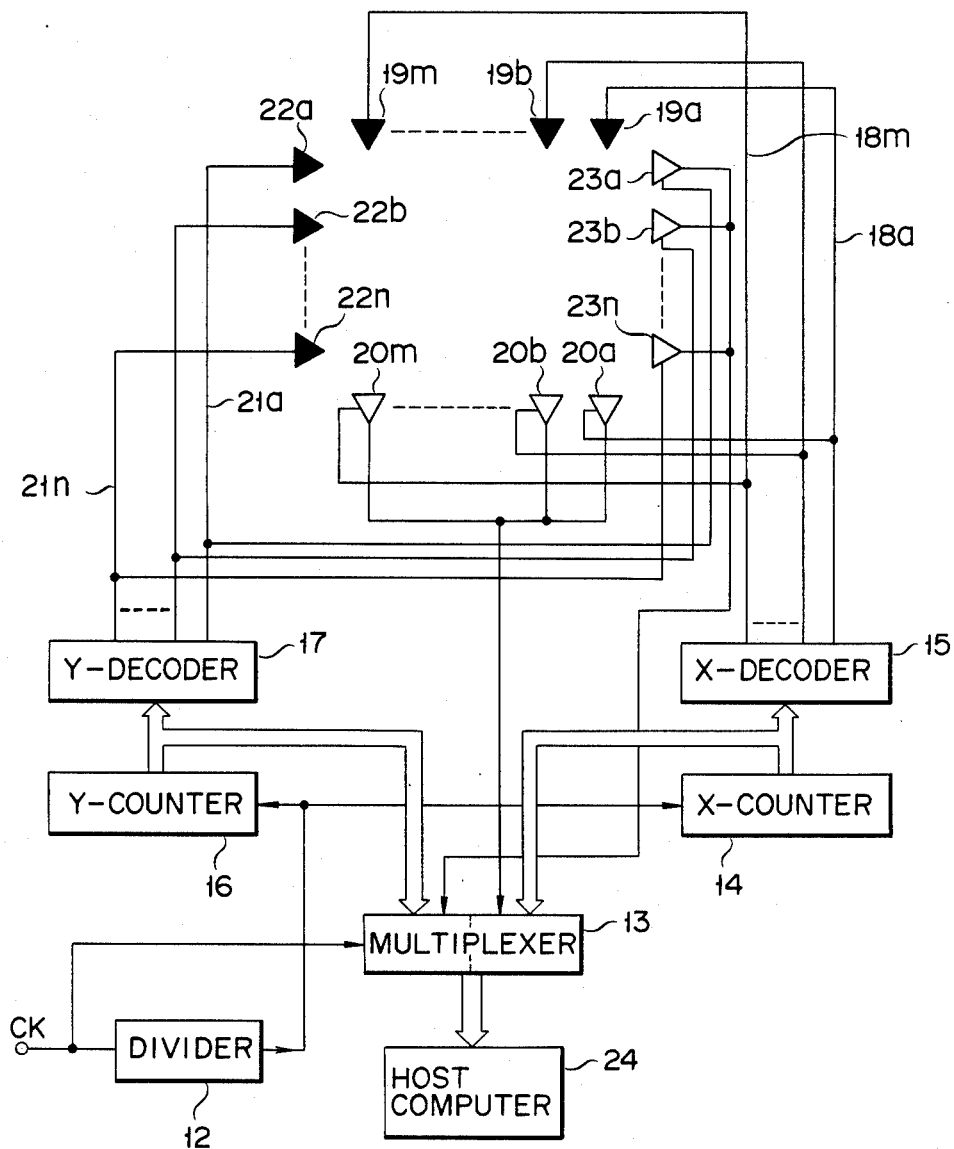
FIG. 1 is a block diagram showing a coordinates detector according to one embodiment of this invention.

One embodiment of this invention will be explained below with reference to a block diagram in FIG. 1.

A clock signal CK for controlling the general operation timing of the coordinates detector is supplied to a clock input terminal 11. The clock signal CK is delivered to a frequency divider 12 and multiplexer 13. The frequency divider 12 is adapted to frequency-divide the clock signal CK into one half its original level and delivers it to X and Y counters 14 and 16. The X counter 14 is a scale of m counter which corresponds to an m number of pairs of light emitting and receiving elements arranged in an X direction. The X counter 14 counts the outputs of the frequency divider 12 and, after having been converted to scale-of-m data, delivers the data to an X decoder 15 and multiplexer 13.

The Y counter 16 is a scale of n counter which corresponds to an n number of pairs of light emitting and receiving elements arranged in a Y direction. The Y counter 16 counts the outputs of the frequency divider 12 and, after having been converted to scale-of-n data, delivers the data to a Y decoder 17 and multiplexer 13. In consequence, an m number of sequentially selected lines 18a, 18b, ..., 18m are derived from the X decoder 15.

Enable signals are sequentially supplied to the m number of pairs of mutually opposite light emitting and receiving elements 19a, 20a; 19b, 20b; ...; and 19m, 20m arranged in the X direction. The detection outputs of the respective light receiving elements 20a, 20b, ..., 20m are connected to another input of the multiplexer 13.

Similarly, an n number of sequentially selected lines 21a, 21b, ..., 21n are derived from the Y decoder 17 and enable signals are sequentially supplied to the n number of pairs of mutually opposite light emitting and receiving elements 22a, 23a; 22b, 23b; ... and 22n, 23n arranged in the Y direction. The detection outputs of the respective light receiving elements 23a, 23b, ..., and 23n are connected to another terminal of the multiplexer 13.

The multiplexer 13 performs a switching operation upon receipt of the clock signal CK, and alternately selects the count value of the X counter 14 and detection output of the respective light receiving elements 20a, 20b, ..., and 20m, or the count value of the Y counter 16 and detection output of the respective light receiving elements 23a, 23b, ..., and 23n. The selected count values of the X and Y counters 14 and 16 and selected detection outputs of the light receiving elements 20a, 20b, ..., and 20m and 23a, 23b, ..., and 23n are delivered to a host computer 24 where they are temporarily stored as memory data. It is, therefore, possible to obtain X and Y direction designation positions from the count values of the counters 14 and 16 which are involved when the detection output of the memory data is shut off, that is, when an optical path from the light emitting element to the light receiving element is shut off.

Figure 2:
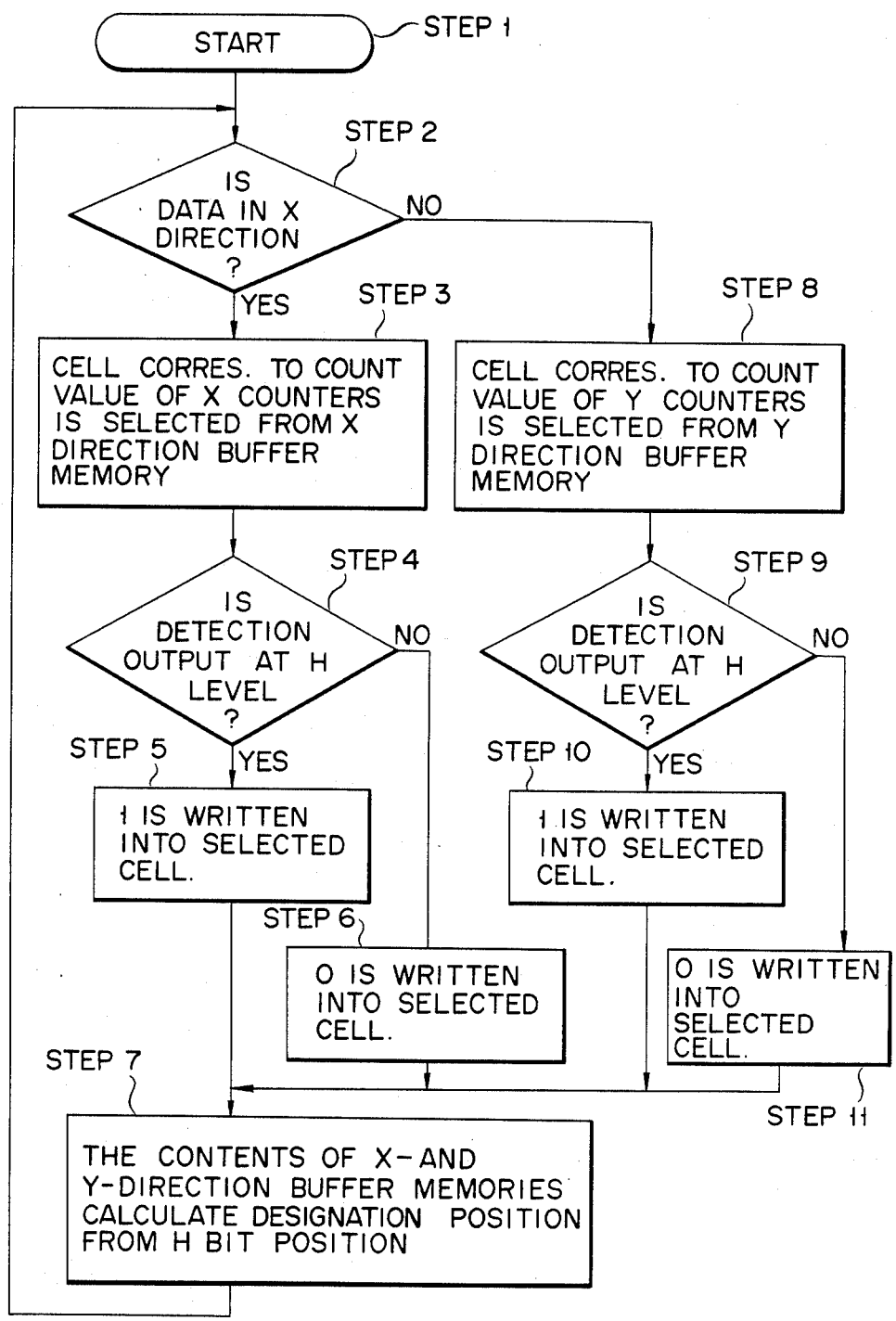
FIG. 2 is a flow chart showing a program of a host computer of the embodiment shown in FIG. 1.

FIG. 2 is a flow chart for obtaining a position designated by the host computer 24. It is to be noted that the light receiving elements 20 and 23 are adapted to produce an output "L" when incident light is received and an output "H" when incident light is shut off, and that the host computer 24 initially determines those memory areas of the X and Y directions which correspond to the number of the light sensor means of the X and Y directions.

At step 1, a program starts to run and, at step 2, the computer judges whether the output data of the multiplexer 13 is the X direction data or the Y direction data. If the output data of the multiplexer is judged as being the X direction data, then at step 3 the X direction buffer memory cell is selected which corresponds to the count value of the X counter 14. At step 4, the computer judges the output of the light receiving element and, at step 5 or 6, the data corresponding to the selected memory cell is written in. At step 7, the computer computes the designation position on the basis of the contents of the X and Y direction buffer memory, and the process goes back to step 2.

If, on the other hand, at step 2 the output data of the multiplexer is judged as being the Y direction data, the Y direction buffer memory cell corresponding to the count value of the Y counter 16 is selected at step 8. Then, at step 9 the computer judges the output of the light receiving element and, at step 10 or 11, corresponding data is written into the selected memory cell. Then, at step 7 the computer computes the designation position.

The array of the m number of pairs of X direction light emitting and receiving elements and n number of pairs of Y direction light emitting and receiving elements permits m×n positions to be detected in the coordinates (X, Y) plane.

With, for example, m representing a greater value of m and n, the time T' required to scan all pairs of light transmitting and receiving elements is given by:

$$T' = m \times \Delta t$$

If, for example, m=n, then the time T' becomes equal to one half the above-mentioned time T which is required on the conventional coordinates detector.

Where the pair of X and Y direction light emitting and receiving elements are to be simultaneously scanned as in the above-mentioned embodiment, a proper countermeasure must be adopted to avoid a possible error detection. It is, therefore, preferred that the individual elements be arranged at a greater interval and be designed to have a better direction. The former condition is determined depending upon the elements used and the latter is determined mainly in accordance with the actual design of the detector. In the coordinates detector of FIG. 1, therefore, scanning is performed from right to left in the X direction and from up to down in the Y direction as viewed on the drawing paper. Furthermore, as greater a distance as practical is left between the enabled light emitting and receiving elements.

Figure 3:
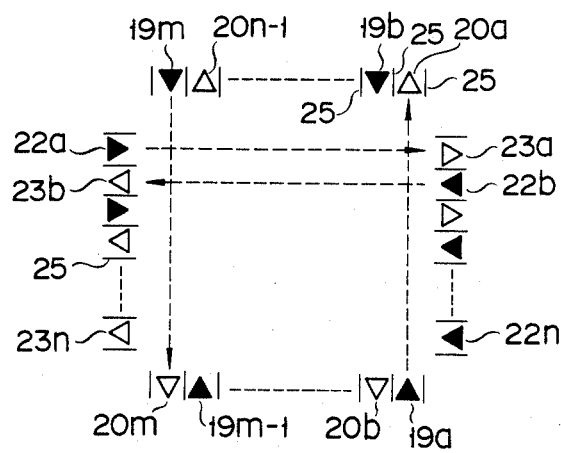
FIG. 3 shows an array of light emitting and receiving elements of a coordinates detector according to another embodiment of this invention.

FIG. 3 shows an array of light emitting and receiving elements on a coordinates detector according to another embodiment of this invention.

In FIG. 3, X direction light emitting elements 19a, 19b..., and 19m and X direction light receiving elements 20a, 20b, ..., and 20m are arranged in pairs of 19a, 20a; 19b, 20b; ...; and 19m, 20m with their adjacent optical paths alternately reversed in the up and down directions. Similarly, Y direction light emitting elements 22a, 22b, ..., and 22n and Y direction light receiving elements 23a, 23b, ..., and 23n are arranged in pairs of 22a, 23a; 22b, 23b; ...; and 22n, 23n with their adjacent optical paths alternately reversed in the right and left directions as shown in FIG. 3. A light leakage shielding plate 25 is disposed between the adjacent elements to enhance the direction of the paired elements.

This arrangement can reduce a possible light leakage between the paired light emitting and receiving elements, thus assuring an exact position detection and a free scanning operation in the X and Y directions.

Figure 4:
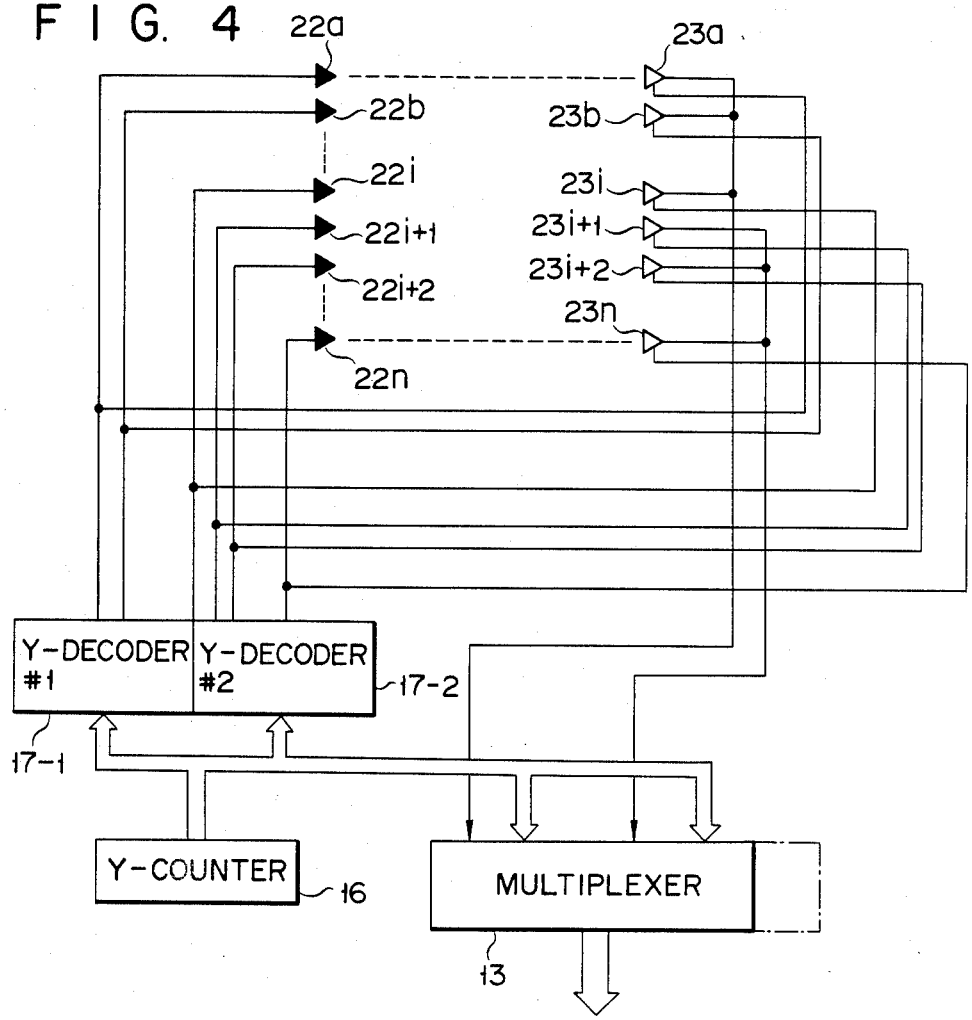
FIG. 4 shows a coordinates detector according to another embodiment of this invention.

FIG. 4 is a block diagram showing a coordinates detector according to another embodiment of this invention. In FIG. 4, first and second decoders 17-1 and 17-2 are provided on a Y direction side, and Y direction light emitting elements 22a, 22b, ..., 22i, 22i+1, 22i+2, ..., and 22n are simultaneously scanned by a plurality of scanning signals of the separated first and second decoders 17-1 and 17-2. In this way, for example, two simultaneously enabling light emitting elements 22a and 22i+1 can be separated at a certain distance without involving a possible light leakage.

Although, in FIG. 4, an explanation has been restricted only to the Y direction first and second decoders, it can also be true of corresponding X direction decoders. The arrangement of FIG. 4 permits position data to be detected at much higher speeds.

In the embodiment of FIG. 1, the position data is stored in the host computer and the designation position is detected based on the memory contents. The same operation can be performed using, for example, a shift register and latch which are operated in synchronism with the output of the frequency divider 12.

What is claimed is:

1. A coordinate detector comprising:
   X and Y direction light beam detection means comprised of a plurality of pairs of light beam emitting and receiving elements arranged parallel to X and Y axes in a orthogonal coordinates plane where a designation position is detected;
   first means for sequentially enabling the X direction light detection means;
   second means separate from said first means for sequentially enabling the Y direction light detection means independently of the first means so that each one of the enabled X direction light detection means is simultaneously enabled with one of the enabled Y direction light detection means; and
   means for storing a detection output of the X and Y direction light detection means and for permitting a designation position to be obtained from the position of a pair of light emitting and receiving elements where X and Y direction light beam emitted from light emitting elements in the X and Y direction light detection means is blocked;
   wherein the X direction emitting elements and the Y direction emitting elements are enabled independently of each other so that any range of X emitters and Y emitters may be selected.

2. A coordinates detector according to claim 1, in which said X and Y direction light detection means are comprised of alternately arranged light emitting and receiving elements.

3. A coordinates detector according to claim 1, in which light leakage shielding plates are each disposed between adjacent ones of said elements.

4. A coordinates detector according to claim 1, in which said enabling means comprises:
- a scale-of-m X counter corresponding to m pairs of X direction light detection means;
- an X decoder responsive to a count output of said X counter for selectively enabling the respective X-direction light detection means;
- a scale-of-n counter corresponding to n pairs of Y direction light detection means; and
- a Y decoder responsive to a count output of said Y counter for selectively enabling the respective light detection means.

5. A coordinates detector according to claim 4, in which said scale-of-m X counter and said scale-of-n Y counter perform their count operations upon receipt of a frequency-divided version of a clock signal; and the count value of said X counter and detection output of said light detection means commonly connected or the count value of the Y counter and detection output of said Y direction light detection means are delivered to said storing means through a multiplexer which performs a switching operation in synchronism with the clock signal.

6. A coordinates detector according to claim 5, in which said clock signal is, after being frequency-converted to one half its original level, sent to said X and Y counters.

7. A coordinate detector according to claim 1, wherein any portion of the orthogonal coordinates plane may be enabled.

8. A coordinate detector according to claim 1, wherein said first means includes means for sequentially driving the X direction light emitting elements; said second means includes means for sequentially driving the Y direction light emitting elements; and the detector further comprises means for driving said X and Y direction light emitting elements driving means simultaneously.

* * * * *